J. M. CANFIELD.
APPARATUS FOR MAKING BEVERAGES.
APPLICATION FILED FEB. 5, 1916.
1,191,760.
Patented July 18, 1916.
3 SHEETS—SHEET 1.
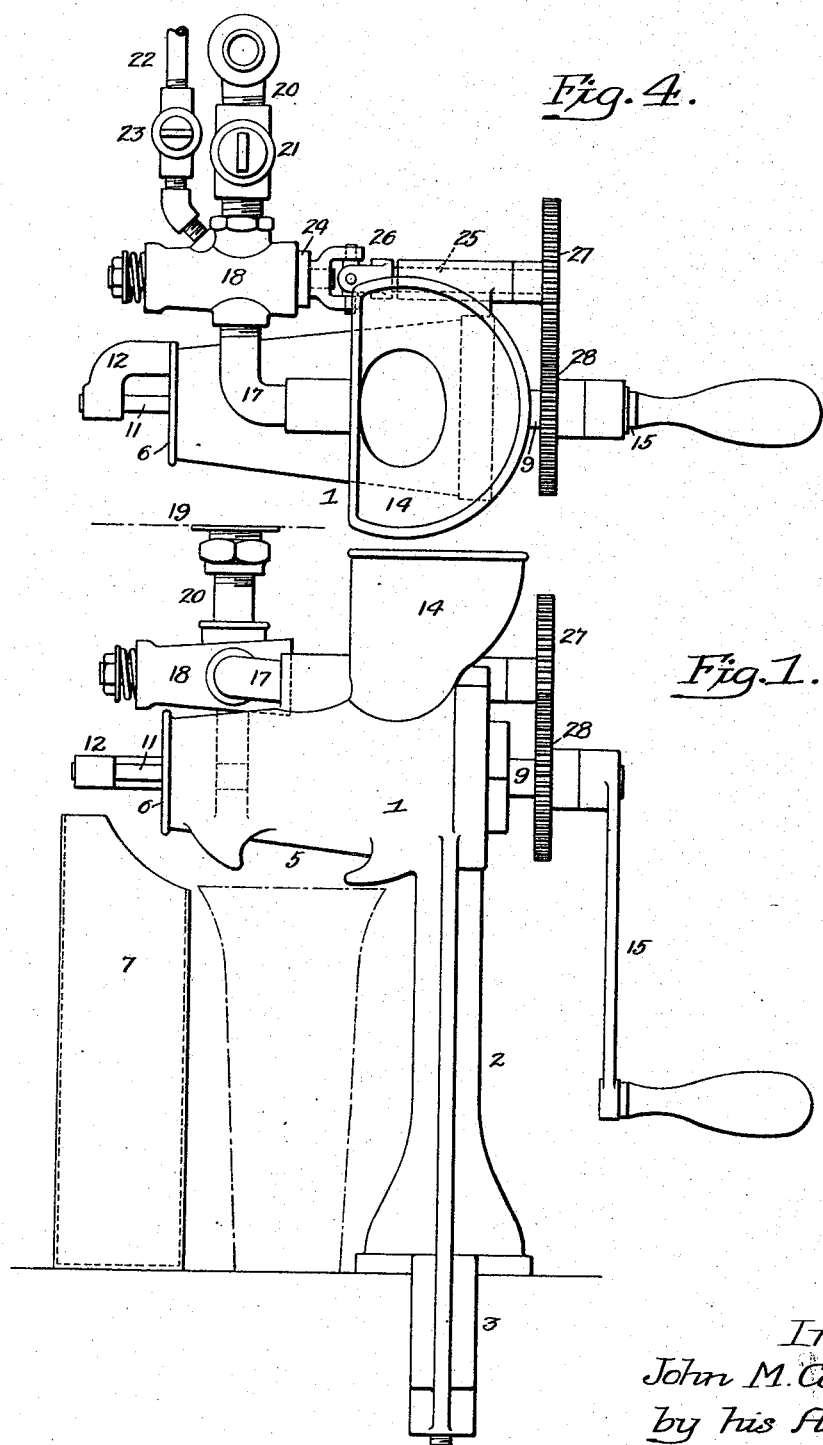
Inventor:
John M. Canfield
by his Attorneys J. M. CANFIELD.
APPARATUS FOR MAKING BEVERAGES.
APPLICATION FILED FEB. 5, 1916.
1,191,760.
Patented July 18, 1916.
3 SHEETS—SHEET 2.
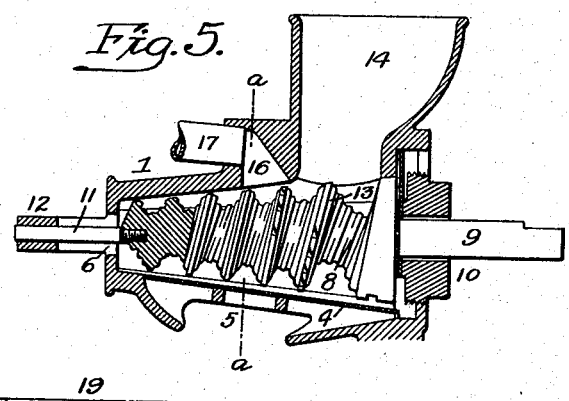
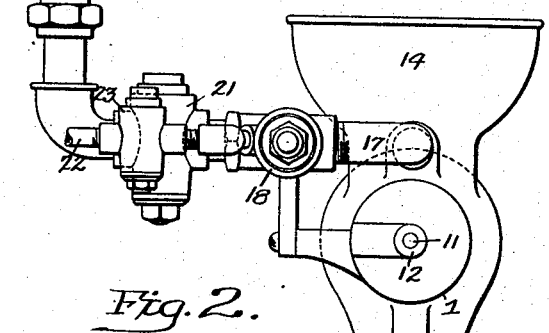
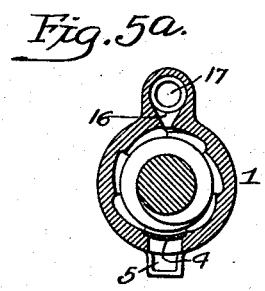
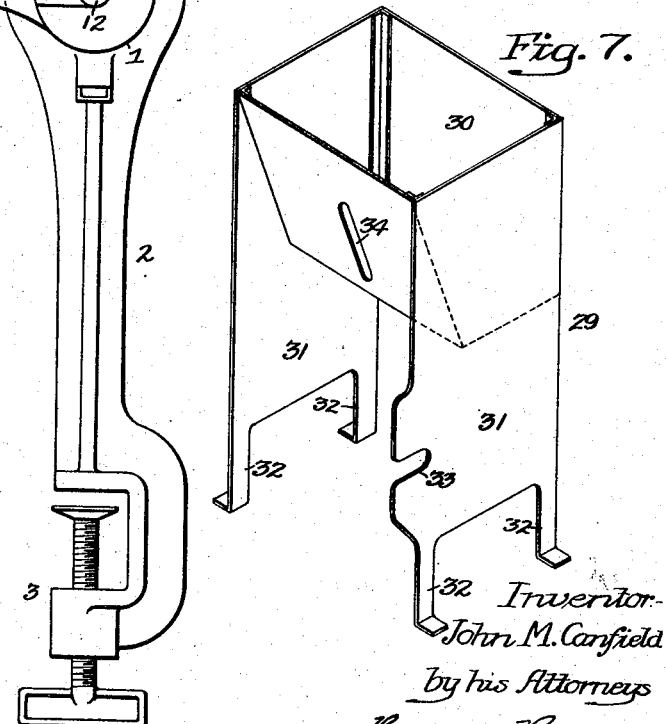
Inventor-
John M. Canfield
by his Attorneys
Howson & Howson

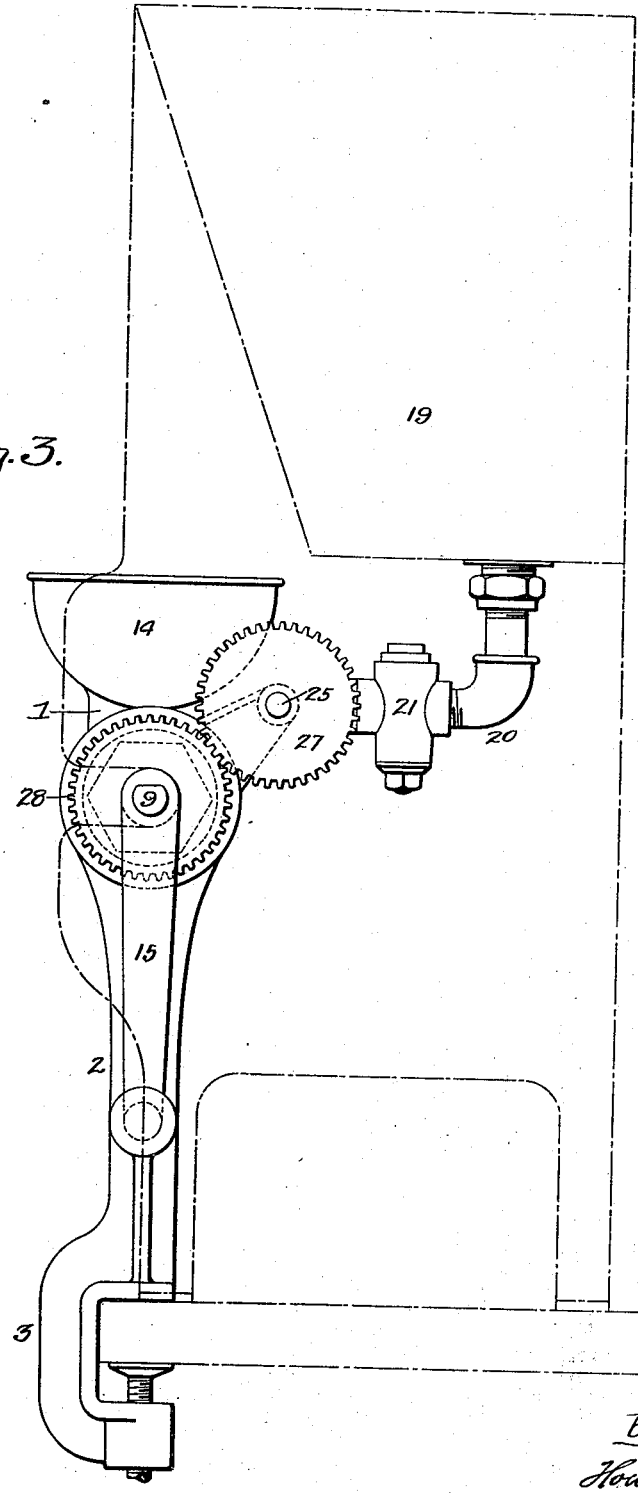

UNITED STATES PATENT OFFICE.

JOHN M. CANFIELD, OF NORTH GLENSIDE, PENNSYLVANIA.

APPARATUS FOR MAKING BEVERAGES.

1,191,760.  Specification of Letters Patent.  Patented July 18, 1916.

Application filed February 5, 1916. Serial No. 76,360.

*To all whom it may concern:*

Be it known that I, JOHN M. CANFIELD, a citizen of the United States, and a resident of North Glenside, county of Montgomery, State of Pennsylvania, have invented certain Improvements in Apparatus for Making Beverages, of which the following is a specification.

My invention relates to certain improvements in apparatus for making beverages, which is located on a counter and by which fruit juices are extracted and combined with syrups to make a palatable concoction.

The invention relates particularly to mechanism for making a concoction in which orange flavor predominates.

One object of the invention is to provide a machine which not only extracts the juice from an orange, but also the oil contained in the orange skin, as it has been found that the pungent flavor of the oil in an orange skin adds greatly to the flavor of the beverage.

A further object of the invention is to provide means for properly mixing a syrup and water with the juice and oil of the orange so as to insure a uniform mixture.

A still further object of the invention is to construct the apparatus so that water can be injected into the extracting chamber to wash out the oil from the disintegrated and compressed orange skins.

In the accompanying drawings: Figure 1 is a side view of my improved apparatus; Fig. 2 is a view looking at the front end of the machine; Fig. 3 is a view looking at the rear end of the machine; Fig. 4 is a plan view; Fig. 5 is a longitudinal sectional view; Fig. 5ª is a transverse sectional view on the line *a—a*, Fig. 5; Fig. 6 is a sectional view of the syrup tank; and Fig. 7 is a perspective view of the frame for holding the tank.

Referring to the drawing, 1 is the casing of the machine mounted on a suitable standard 2 having a clamp 3 by which it is attached to a counter, table, or other fixture. The extracting chamber is conical in shape and has in the bottom a perforated plate 4, which is preferably made detachable. Under this plate is an outlet 5 of such a size that the juice will flow into a glass located under the apparatus. At the end of the casing is an outlet 6 for the pulp or waste material, which, in the present instance, is discharged into a suitable container 7, Fig. 1. 8 is the feed screw, shaped to fit the conical chamber in the casing 1, and has a rear spindle 9 adapted to a bearing in the cap 10 which closes the rear end of the casing and has a forward spindle 11 adapted to a bearing 12. The feed screw 8 has in addition to the ordinary screw thread a series of narrow ribs 13, and the main screw is notched, as shown, so that when a section of orange is inserted through the hopper 14 and the screw is turned, the juice is not only extracted from the pulp of the orange, but the skin or rind is squeezed or buckled by the ribs so as to extract the oil contained in the rind and this is washed out and passes with the juice into the glass or other container. On the stem 9 of the screw is mounted a handle 15, in the present instance, but when the apparatus is to be driven by power a belt wheel is substituted for the handle.

In order to thoroughly incorporate water with the juice as it is pressed from the section of orange, I provide a passage 16 in the casing and this is connected through a pipe 17 with a valve casing 18.

19 is a tank containing a syrup, which I incorporate with the juice of the orange to make the drink more palatable and this tank is connected to the valve casing 18 by a pipe 20 in which is a stop valve 21 for cutting off the tank. A water pipe 22 connects with the valve casing 18, as shown, so as to supply water to the syrup and orange juice and oil. A stop valve 23 in this pipe is arranged to cut off the supply of water.

I find that by introducing water into the casing while the juice and oil are being extracted from the orange the water washes the oil from the pulp and skin and a greater percentage of oil is introduced into the drink than if water were not supplied at this point.

24 is a valve mounted in the valve casing 18 and this valve is automatically operated when the screw 8 is turned. In the present instance, the valve stem 24 is coupled to a shaft 25 by a universal joint 26 and on the rear of this shaft 25 is a gear wheel 27 which meshes with another gear wheel 28 on the stem 9 of the screw 8 so that, as the screw is turned, the valve is opened and closed, allowing a certain amount of syrup and water to be admitted to the casing, which will flow through the casing with the juice into the glass, or other receptacle, and the proportion is such that when the glass is filled it will contain the proper amount of liquid.

In the present instance, the syrup tank 19 is mounted in a frame 29 located at the back of the casing 1, and the frame consists of a box 30 and side members 31 having legs 32, which rest on the counter, or other support. The rear side member is notched at 33 to receive the stem 9 of the screw, thus the gear wheels are protected and the working parts are inclosed. The box 30 is slotted at 34 so as to expose the glass tank 19 and the operator can see the level of the liquid in the tank at a glance.

In some instances, the syrup may be supplied independently of the water and the water only may be used as a means of washing the oil out of the pulp and skins. In this instance, the syrup would be supplied separately. The machine may be made larger than for counter use and for filling individual glasses, since the juice and oil may be extracted and stored for future use.

The passage 16 is preferably made as shown in Fig. 5ª with a contracted outlet, but it may be arranged and shaped in any manner desirable to allow the liquid to flow into the chamber and prevent the pulp entering the passage. In some instances, the pipe may be coupled directly with the hopper, if found more desirable.

The conical extracting chamber has the usual longitudinal retarding ribs, as shown in Figs. 5 and 5ª, which act in conjunction with the screw to compress the pulp and rind, the juice and oil passing through the perforations in the plate 4, while the pulp and rind pass through the outlet 6 to the waste receptacle.

While I have shown the valve casing 18 arranged horizontally and the valve 24 coupled directly to the shaft 25, it may be arranged in any position desired and indirectly coupled to the shaft without departing from the main features of the invention.

I claim:

1. The combination in apparatus for making a beverage, of a casing; a compressing screw mounted in the casing; means for turning the said screw; a hopper, said casing having a discharge opening for the juice and another discharge opening for the pulp; a passage in the casing; a pipe connected to the passage; a valve casing connected to the pipe and to a liquid supply; and means connecting the valve with the screw so that on turning the screw the valve will be opened and closed.

2. The combination in apparatus for making a beverage, of a casing having an extracting chamber therein; a conical screw mounted in the chamber, the casing having a hopper and an outlet for juice and another outlet for the pulp; a valve casing communicating with the extracting chamber; a valve in the valve casing; a shaft coupled to the valve; a gear wheel on said shaft; and a gear wheel on the stem of the screw with which the first mentioned gear wheel meshes so that on turning the screw the valve will be opened and closed.

3. The combination in apparatus for making a beverage, of a casing having a conical extracting chamber; a feed screw adapted to the chamber and having a main compressing thread, the edges of the thread being notched; and supplemental shallow ribs formed on the screw and conforming to the shape of the thread, whereby the skin of the fruit is squeezed or buckled as it is passed through the apparatus.

JOHN M. CANFIELD.